United States Patent
Meier

[15] 3,637,240
[45] Jan. 25, 1972

[54] DETACHABLE CONNECTION FOR A FLUID MEDIUM-PRESSURE HOSE WITH A CONNECTING FITTING

[72] Inventor: Erwin Meier, Zug, Switzerland
[73] Assignee: Contraves AG, Zurich, Switzerland
[22] Filed: Mar. 3, 1970
[21] Appl. No.: 16,132

[52] U.S. Cl. ................................. 285/238, 285/305
[51] Int. Cl. ........................................... F16l 33/00
[58] Field of Search ............... 285/423, 238, 305, 415, 259, 285/381, 174, 321

[56] References Cited

UNITED STATES PATENTS

| 2,560,263 | 7/1951 | Wiegund et al. | 285/347 X |
| 2,521,127 | 9/1950 | Price | 285/321 X |

FOREIGN PATENTS OR APPLICATIONS

| 1,145,667 | 3/1969 | Great Britain | 285/305 |
| 225,046 | 2/1969 | Sweden | 285/415 |
| 626,296 | 4/1963 | Belgium | 285/423 |
| 910,578 | 11/1962 | Great Britain | 285/321 |

*Primary Examiner*—Dave W. Arola
*Attorney*—Werner W. Kleeman

[57] ABSTRACT

There is disclosed a detachable connection for a fluid medium-pressure hose formed of thermoplastic material with a connecting fitting, wherein a metallic ring member is anchored at a predetermined distance from the end of the pressure hose in the wall thereof, and a sealing O-ring formed of elastomeric material is inserted in a bore of the connecting fitting. The connecting fitting is provided additionally with a pair of tangentially extending substantially parallel bores at the wall means thereof, and a retaining clamp means having leg portions passing through said parallel tangentially extending bores of the connecting fitting serves to hold the metallic ring member in place through the action of the leg portions and engages behind this metallic ring member. The invention is also concerned with an improved method for the fabrication of the detachable connection discussed above.

5 Claims, 2 Drawing Figures

PATENTED JAN 25 1972

3,637,240

3,637,240

DETACHABLE CONNECTION FOR A FLUID MEDIUM-PRESSURE HOSE WITH A CONNECTING FITTING

BACKGROUND AND SUMMARY OF THE INVENTION

The present invention relates to an improved detachable connection of a fluid medium-pressure hose with a connection fitting, and further concerns a new and improved method for the fabrication thereof.

It is a primary object of the present invention to provide an improved detachable connection of a fluid medium-pressure hose with a connecting fitting as well as to provide an improved method for the fabrication thereof.

A further more specific object of the present invention relates to an improved detachable connection of a fluid medium-pressure hose with a connecting fitting, which connection can be quickly fabricated, with little effort, and in a safe and reliable manner, resulting in perfect sealing relationship between the pressure hose and the connecting fitting.

Now, in order to implement these and still further objects of the invention, which will become more readily apparent as the description proceeds, the detachable connection of a fluid medium-pressure hose formed of thermoplastic material with a connecting fitting is manifested by the features that a metallic ring member anchored at a certain distance from the hose end in the hose wall and a sealing O-ring member formed of elastomeric material are inserted in a suitable bore of the connecting fitting. The metallic ring member is held in place by the leg portions of a retaining or holding clamp means which passes through parallel tangential bores provided at the wall of said connecting fitting and engages behind the metallic ring member.

The method for the fabrication of such connection as described above is manifested by the features that the metallic ring member is pushed onto the end of the fluid medium-pressure hose, the inner bore of said metallic ring member being equipped with at least one inwardly protruding anchoring rib, the edge means of which is located at a smaller diameter than the external diameter of the pressure hose. Then, after heating of the aforementioned metallic ring member, the anchoring ribs thereof are anchored in the temporarily softened wall of the pressure hose, and the thus prepared hose end, after having placed thereon an elastomeric sealing O-ring, is displaced into a suitable bore of the connecting fitting, and then is detachably secured therein with the aid of a substantially U-shaped retaining clamp means, the leg portions of which pass through tangential bores provided at the wall of the connecting fitting and engage behind the metallic ring member seated upon the fluid medium-pressure hose.

BRIEF DESCRIPTION OF THE DRAWING

The invention will be better understood and objects other than those set forth above, will become apparent, when consideration is given to the following detailed description thereof. Such description makes reference to the annexed drawing wherein.

DETAILED DESCRIPTION OF THE PREFERRED EMBODIMENT

Figure 1:
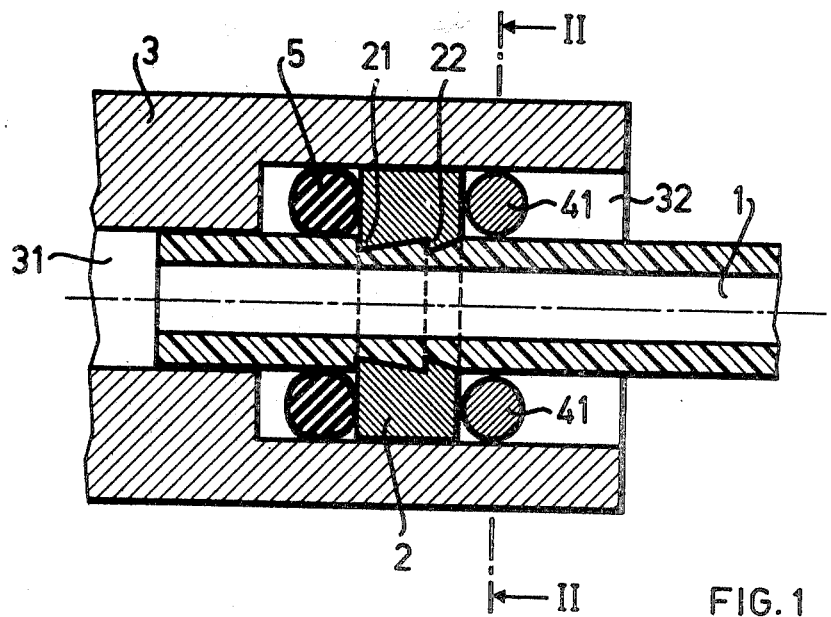
FIG. 1 is a longitudinal fragmentary sectional view through the finished connection of the hose member with the connecting fitting.
Figure 2:
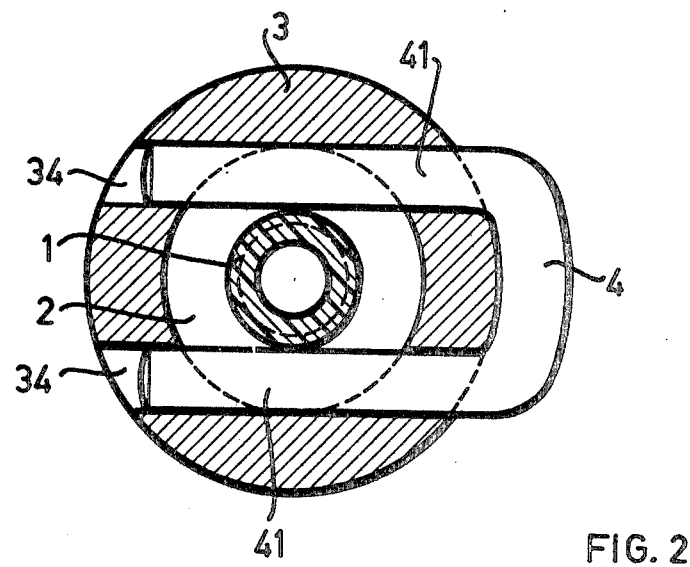
FIG. 2 is a cross-sectional view of the connection arrangement shown in FIG. 1, taken substantially along the line II—II thereof.

Describing now the drawing, in FIG. 1 it will be understood that reference numeral 1 represents a fluid medium-pressure hose formed of a suitable thermoplastic material. At a certain distance from the end of this hose member 1, as shown, there is placed thereon an annular metallic ring member 2, the internal bore of which possesses two inwardly protruding peripheral rib members 21 and 22, as shown in FIG. 1. The edges of these rib members 21, 22 are disposed along a circle which has a somewhat smaller diameter than the external diameter of the hose member 1. Upon heating the metallic ring member 2, after it has been pushed on to the hose member 1, the aforementioned rib members 21 and 22 are anchored in the thus softened thermoplastic material of the wall of the hose member 1. The heat required for raising the temperature of the metallic ring member 2 can be, for instance, advantageously generated by means of an induced eddy current.

Reference character 3 represents the connecting fitting or nipple, which is internally provided with a bore means 31 at the connection end which widens into a further bore means 32 of larger internal diameter, as shown. In the bore means 31 there is fitted the hose member 1 and in the further enlarged bore means 32 there is fitted the metallic ring member 2.

The hose member 1 which is inserted in the connecting fitting 3 is secured in the prescribed location by the leg portions 41 of a substantially U-shaped retaining or holding clamp means 4. The leg portions 41 of such retaining clamp means 4 pass through substantially parallel tangential bores 34 provided at the connecting fitting 3, as shown, and engage behind the metallic ring member 2. In order to seal the connection between the connecting fitting 3 and the hose member 1 there is advantageously provided a suitable sealing O-ring member 5 formed of rubber or elastomeric material.

The illustrated and described connection arrangement can be produced quickly with very little work, results in a faultless sealing arrangement and is not readily subject to corrosion. After removing the inserted retaining clamp means the hose member 1 can be withdrawn from the connecting fitting 3 and again inserted.

While there is shown and described a present preferred embodiment of the invention, it is to be distinctly understood that the invention is not limited thereto, but may be otherwise variously embodied and practiced within the scope of the following claims.

Accordingly, what is claimed is:

1. A detachable connection for a fluid medium-pressure hose member formed of thermoplastic material with a connecting fitting, comprising, in combination, a thermoplastic pressure hose member and a connecting fitting, said connecting fitting having wall means and being provided with bore means for receiving said thermoplastic pressure hose member, a metallic ring member thermally anchored at a predetermined distance from an end of the thermoplastic pressure hose member in the wall thereof, said metallic ring member being substantially annular shaped and provided with an internal bore means, the wall of which is equipped with at least one inwardly extending anchoring means having its innermost end portion disposed along a circle which is smaller in diameter than the external diameter of said hose member for thermally securing said anchoring means in the wall of said thermoplastic pressure hose member due to heating of said metallic ring member, a sealing O-ring member formed of elastomeric material seated upon said thermoplastic pressure hose member in front of said metallic ring member, said sealing O-ring member, thermoplastic pressure hose member and metallic ring member being inserted in said bore means of said connecting fitting, said connecting fitting further being provided with a pair of tangentially extending substantially parallel bores at said wall means of said connecting fitting, a retaining clamp means having leg portions for securing said metallic ring member in place, said leg portions passing through said tangentially extending substantially parallel bores of said connecting fitting and engaging with said metallic member.

2. A detachable connection as defined in claim 1, wherein said annular-shaped metallic ring member is an integral ring structure.

3. A detachable connection as defined in claim 1, wherein all parts of said metallic ring member completely encircle a portion of the outer wall of said thermoplastic pressure hose member.

4. A detachable connection as defined in claim 1, wherein the portion of said thermoplastic pressure hose member which extends forwardly of said sealing O-ring member and said metallic ring member is totally freely exposed and received as such in said bore means of said connecting fitting.

5. A detachable connection as defined in claim 1, wherein said leg portions of said retaining clamp means engage freely behind said metallic ring member.

* * * * *